UNITED STATES PATENT OFFICE.

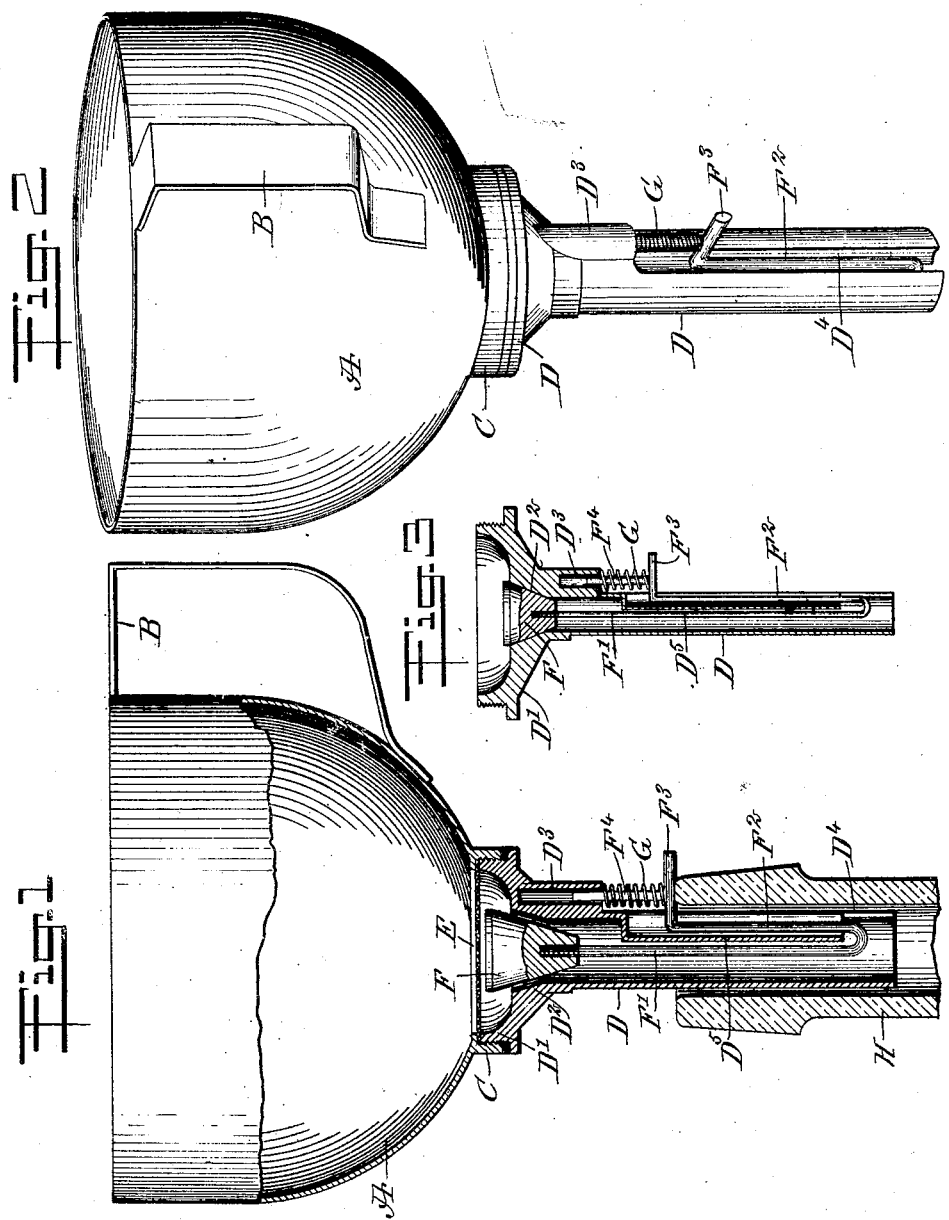

JAMES PETER MURTHA, OF LITTLE ROCK, ARKANSAS, ASSIGNOR OF ONE-HALF TO JOHN H. TURCOTTE, OF ST. LOUIS, MISSOURI.

FUNNEL.

No. 886,237.  Specification of Letters Patent.  Patented April 28, 1908.

Application filed May 21, 1907. Serial No. 374,891.

*To all whom it may concern:*

Be it known that I, JAMES P. MURTHA, a citizen of the United States, and a resident of Little Rock, in the county of Pulaski and State of Arkansas, have invented a new and Improved Funnel, of which the following is a full, clear, and exact description.

The invention relates to liquid distribution, and its object is to provide a new and improved funnel which is simple and durable in construction, and provided with a large bowl or body and interchangeable spouts of different sizes, to permit convenient filling of large or small bottles, and to allow filling successively of a number of bottles with one charge and without danger of spilling or wasting the liquid retained in the bowl during the transfer of the funnel from one bottle to another.

The invention consists of novel features and parts and combinations of the same, which will be more fully described hereinafter and then pointed out in the claim.

A practical embodiment of the invention is represented in the accompanying drawings forming a part of this specification, in which similar characters of reference indicate corresponding parts in all the views.

Figure 1 is a sectional side elevation of the improvement as applied; Fig. 2 is a perspective view of the improvement, and Fig. 3 is a sectional side elevation of one of the interchangeable spouts.

The bowl A of the funnel is provided at one side with a handle B and at its bottom with a nipple C, in which screws the entrance end D' of a spout D, the said entrance end being preferably covered by a screen E so as to prevent undesirable matter passing from the bowl A into the spout D when filling a vessel. In the entrance end of the spout D is formed a valve seat $D^2$ adapted to be engaged by a valve F having a downwardly extending valve stem F' terminating at its lower end in an upwardly extending portion $F^2$, from which extends a transverse arm $F^3$ pressed on by a spring G coiled on a guide pin $F^4$ attached to the arm $F^3$ and engaging a guide way $D^3$ formed on the outside of the spout D at the entrance end thereof. The arm $F^3$ extends through a vertically extending slot $D^4$ formed in one side of the spout D, and the said slot $D^4$ is covered by a shield $D^5$, forming an integral part of the spout D and extending within the same, as plainly indicated in the drawings.

Now when the funnel is not in use, the spring G holds the valve F normally to its seat $D^2$, so that the contents of the bowl A are retained while transferring the funnel from one vessel to another. When the spout D of the funnel is passed into the neck of a bottle H, for instance, as shown in Fig. 1, and the operator releases the funnel, then the arm $F^3$ is seated on the top of the neck of the bottle and the weight of the funnel now causes a downward movement of the spout and bowl A, so that the valve F is moved off its seat and the spring G is compressed. The contents of the bowl A are now passed through the strainer E into the spout D and from the latter into the bottle H, and when the filling is completed the operator lifts the funnel so that the spring G immediately moves the valve F to its seat $D^2$, thus cutting off the bowl A from the spout D and retaining the liquid within the bowl during the transfer of the funnel to another bottle to be next filled. By having the spout D removably connected with the nipple C it is evident that spouts of different sizes can be readily employed on the same bowl A for filling larger and smaller bottles, it being understood, however, that the entrance end D' of each spout is of the same size so as to readily screw into the same nipple C, as will be readily understood by comparison with Figs. 1 and 3.

The funnel shown and described is very simple and durable in construction, is composed of comparatively few parts, not liable to get easily out of order.

Having thus described my invention, I claim as new and desire to secure by Letters Patent:

A funnel comprising a bowl, a spout thereon, having a slot extending lengthwise thereof, a valve seat in the enlarged end of said spout, a shield arranged longitudinally within the spout over the said slot, a valve adapted to be seated on the said seat a stem in connection with the valve, a portion of which extends down the spout, and this portion terminating in a bent up portion extending within the shield, the upper end of the bent up portion terminating in a transverse arm for engagement with the neck of the vessel to be filled, a guide pin on said arm slidably engaging a bearing on the spout, and a spring coiled on the guide pin and pressing the said arm to hold the valve normally to its seat.

In testimony whereof I have signed my name to this specification in the presence of two subscribing witnesses.

JAMES PETER MURTHA.

Witnesses:
E. R. BARNHARDT,
H. P. EDMONSON.